(12) United States Patent
Joo et al.

(10) Patent No.: US 10,248,537 B2
(45) Date of Patent: Apr. 2, 2019

(54) TRANSLATION BUG PREDICTION CLASSIFIER

(71) Applicant: Microsoft Technology Licensing, LLC, Redmond, WA (US)

(72) Inventors: Dong Kwon Joo, Bellevue, WA (US); Kevin O'Donnell, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 963 days.

(21) Appl. No.: 14/698,776

(22) Filed: Apr. 28, 2015

(65) Prior Publication Data
US 2016/0321160 A1    Nov. 3, 2016

(51) Int. Cl.
| G06F 17/00 | (2006.01) |
| G06F 11/36 | (2006.01) |
| G06F 17/28 | (2006.01) |
| G06N 5/02  | (2006.01) |

(52) U.S. Cl.
CPC ...... G06F 11/3608 (2013.01); G06F 17/2854 (2013.01); G06N 5/02 (2013.01)

(58) Field of Classification Search
CPC .............................. G06F 17/28; G06F 17/289
USPC .............................................................. 704/2
See application file for complete search history.

(56) References Cited

U.S. PATENT DOCUMENTS

| 5,974,372 A | 10/1999 | Barnes et al. |
| 6,507,812 B1 | 1/2003 | Meade et al. |
| 6,567,973 B1 | 5/2003 | Yamamoto et al. |
| 7,509,318 B2 | 3/2009 | Shaath et al. |
| 7,543,189 B2 | 6/2009 | Fichter et al. |
| 7,793,156 B2 | 9/2010 | Tsurumi et al. |
| 7,822,596 B2 * | 10/2010 | Elgazzar ............ G06F 17/28 704/2 |
| 7,996,417 B2 | 8/2011 | Travieso et al. |
| 8,171,460 B2 | 5/2012 | Pizzoli et al. |
| 8,380,486 B2 * | 2/2013 | Soricut ............ G06F 17/289 704/2 |
| 8,645,928 B2 | 2/2014 | Chu et al. |
| 2002/0091510 A1 | 7/2002 | Forrest et al. |
| 2010/0004917 A1 | 1/2010 | Ashworth et al. |

(Continued)

FOREIGN PATENT DOCUMENTS

| CN | 1547116 A | 11/2004 |
| WO | 2011041675 A1 | 4/2011 |

OTHER PUBLICATIONS

He, et al., "Software Internationalisation and Localisation: Practice and Evolution", In Proceedings of the Inaugural Conference on the Principles and Practice of Programming in Java 2002, Jun. 13, 2002, pp. 89-94.

(Continued)

*Primary Examiner* — Daniel Abebe
(74) *Attorney, Agent, or Firm* — Arent Fox LLP

(57) ABSTRACT

In one embodiment, a translation system may use a translation bug prediction model to more efficiently identify translation errors in a user interface text string. The translation system may apply a translation bug prediction model to a translation resource to identify a potential error source. The translation system may associate an attention flag with the translation resource when identified as the potential error source. The translation system may execute an automatic translation of the translation resource to create a translation target.

19 Claims, 7 Drawing Sheets

(56) References Cited

U.S. PATENT DOCUMENTS

| | | |
|---|---|---|
| 2012/0296630 A1 | 11/2012 | Ghassemi et al. |
| 2014/0222413 A1 | 8/2014 | Rossmann |
| 2014/0297252 A1* | 10/2014 | Prasad .................. G06F 17/289 704/2 |
| 2015/0286632 A1 | 10/2015 | Meunier |

OTHER PUBLICATIONS

Turing, A. M., "Computing Machinery and Intelligence", Retrieved at <<http://www.csee.umbc.edu/courses/471/papers/turing.pdf>>, Mind vol. 59, No. 236, 1950, pp. 433-460.

"International Preliminary Report on Patentability Issued in PCT Application No. PCT/US2016/026091", dated Jul. 18, 2017, 7 Pages.

"Second Written Opinion Issued in PCT Application No. PCT/US2016/026091", dated Mar. 21, 2017, 6 Pages.

"International Search Report & Written Opinion Issued in PCT Application No. PCT/US2016/026091", dated Jun. 8, 2016, 11 Pages.

Bojar, et al., "Findings of the 2013 Workshop on Statistical Machine Translation", In Proceedings of the Eighth Workshop on Statistical Machine Translation, Association for Computational Linguistics, Jul. 30, 2011, 44 Pages.

Blatz, et al., "Confidence Estimation for Machine Translation", In Proceedings of the 20th International Conference on Computational Linguistics, Aug. 23, 2004, 7 Pages.

* cited by examiner

TRANSLATION BUG PREDICTION CLASSIFIER

BACKGROUND

A user interface may have multiple text strings to present to a user. As a user interface is released in regions using different languages, those text strings may act as a translation resource to be translated into the local language. A developer may use an automatic translator program to translate these text strings automatically. Even the most efficient translator may have the occasional mistranslation, or "bug". A translation administrator may review the translation target of each translation to try to identify any mistranslations.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to using a translation bug prediction model to more efficiently identify translation errors in a user interface text string. The translation system may apply a translation bug prediction model to a translation resource to identify a potential error source. The translation system may associate an attention flag with the translation resource when identified as the potential error source. The translation system may execute an automatic translation of the translation resource to create a translation target.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
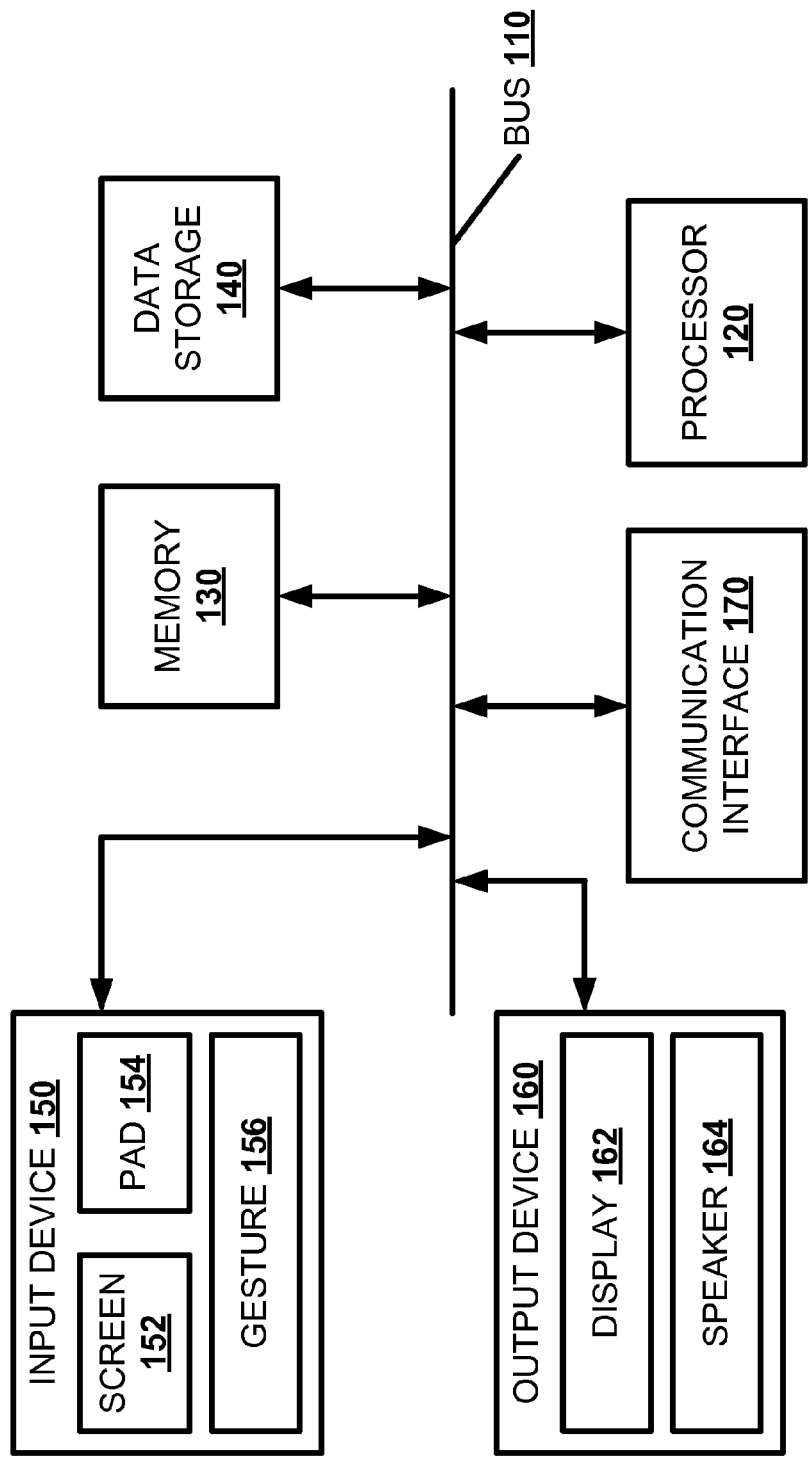
FIG. 1 illustrates, in a block diagram, one embodiment of a computing device.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a translation system, a tangible machine-readable medium having a set of instructions detailing a method stored thereon for at least one processor, or a machine-implemented method.

In order to accommodate a global market with multiple languages in use, a software developer may translate the user-facing user interface resources into worldwide languages. This translation effort may cause logistical issues for a proper translation, testing, and bug fixes because of the massive volumes, tight schedule mandated by fierce market competition, and linguistic complexities. A translation system may switch from a conventional, reactive approach to a proactive approach by using machine learning to create a translation bug prediction model for each resource to be translated to predict which resource features may cause translation errors prior to the automatic translation or after the automatic translation but prior to the translation review. The translation system may derive the translation bug prediction model from an examination of the collected resource history data and applying a statistical machine learning model. Thus, the translation system may generate localized versions of software and services with a more thorough review before translation, more targeted attention during translation, and a surgical testing run for the problematic resources identified by translation bug prediction model.

The translation system may query a historic translation pair set to generate a translation training subset. For each historic translation pair in the historic translation pair set, the translation system may check whether the historic translation pair was subject to a translation correction. The translation system may divide each translation resource in the historic translation pair set into a set of resource features. The translation system may parse the translation resource into a bag of words, or a set of individual text segments. In addition to the bag of words, the translation system may generate one or more derived features using localization domain knowledge.

The translation system may select a majority of the historic translation pair set, for example 70%, in a random manner to be a translation training subset. The translation system may generate a naïve Bayesian classifier for each resource feature from the translation training subset. A naïve Bayesian classifier assigns the probability that an object belongs to a category based on a set of independent values, so that the presence of one of the values does not affect the likelihood of the other values. The naïve Bayesian classifier may be represented as a logarithmic value. The translation system may find a relative probability for each resource feature to result in a successful translation and an unsuccessful translation. The translation system may apply a smoothing function, such as LaPlace smoothing or additive smoothing, to the values with an arbitrary delta value to avoid assigning non-zero probabilities to words that do not occur in the translation training subset. The translation system may generate a proportional pass parameter and a proportional bug parameter for each resource feature. The translation system may calculate a successful score and unsuccessful score for each resource feature. The translation may determine the prediction result based on which score is higher.

The translation system may use the remaining translations pairs in the historic translation pair set, for example 30%, as a translation testing subset. The translation system may compare between the original decision and a prediction result based on the translation bug prediction model. If the results match, the prediction result succeeds. If not, the prediction result fails. By summing up the result, the translation system may generate the validation accuracy for an accuracy report.

Via an iterative process of training and validation, the translation system may build a translation bug prediction model. The translation system may parse the resource features of the translation resource. The translation system may calculate a successful score and an unsuccessful score for the translation resource with a translation bug prediction model. The translation system may compare the successful score and the unsuccessful score to determine the prediction result.

Thus, in one embodiment, a translation system may use a translation bug prediction model to more efficiently identify translation errors in a user interface text string. The translation system may apply a translation bug prediction model to a translation resource to identify a potential error source. The translation system may associate an attention flag with the translation resource when identified as the potential error source. The translation system may execute an automatic translation of the translation resource to create a translation target.

FIG. 1 illustrates a block diagram of an exemplary computing device 100 which may act as a translation system. The computing device 100 may combine one or more of hardware, software, firmware, and system-on-a-chip technology to implement a translation system. The computing device 100 may include a bus 110, a processing core 120, a memory 130, a data storage 140, an input device 150, an output device 160, and a communication interface 170. The bus 110, or other component interconnection, may permit communication among the components of the computing device 100.

The processing core 120 may include at least one conventional processor or microprocessor that interprets and executes a set of instructions. The at least one processor may apply a translation bug prediction model to the translation resource to identify a potential error source. The at least one processor may associate an attention flag with the translation resource when identified by the translation bug prediction model as a potential error source. The at least one processor may parse the translation resource into a bag of words. The at least one processor may identify a derived feature from the bag of words in the translation resource. The processing core 120 may have at least one processor configured to execute an automatic translation of a translation resource to create a translation target.

The at least one processor may be further configured to execute a bug prediction model generator. The bug prediction model generator may generate a translation bug prediction model based on a translation training subset from a historic translation pair set. The bug prediction model generator may validate the translation bug prediction model against a translation testing subset from a historic translation pair set. The bug prediction model generator may update the translation bug prediction model based on a periodic review of the historic translation pair set as the historic translation pair set is updated with new translation pairs.

The translation bug prediction model may generate a naïve Bayesian classifier for each resource feature in the translation resource. The translation bug prediction model may calculate a successful score for the translation resource. The translation bug prediction model may calculate an unsuccessful score for the translation resource. The at least one processor may compare an unsuccessful score for the translation resource with a successful score for the translation resource.

The memory 130 may be a random access memory (RAM) or another type of dynamic data storage that stores information and instructions for execution by the processing core 120. The memory 130 may also store temporary variables or other intermediate information used during execution of instructions by the processing core 120. The memory 130 may be configured to store a translation bug prediction model and a translation resource.

The data storage 140 may include a conventional ROM device or another type of static data storage that stores static information and instructions for the processing core 120. The data storage 140 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 140 may store a set of instructions detailing a method that when executed by one or more processors cause the one or more processors to perform the method. The data storage 140 may also be a database or a database interface to access a database that stores a historic translation resource set, a translation bug prediction model, or a translation resource.

The input device 150 may include one or more conventional mechanisms that permit a user to input information to the computing device 100, such as a keyboard, a mouse, a voice recognition device, a microphone, a headset, a touch screen 152, a touch pad 154, a gesture recognition device 156, etc. The output device 160 may include one or more conventional mechanisms that output information to the user, including a display screen 162, a printer, one or more speakers 164, a headset, a vibrator, or a medium, such as a memory, or a magnetic or optical disk and a corresponding disk drive. The output device 160 may present the translation resource or a translation target with the attention flag. The output device 160 may present the attention flag in a similar media format or a different media format from the translation resource or the translation target. For example, a speaker 164 may produce an audio alert representing the attention flag while the display screen 162 presents the translation resource in text format.

The communication interface 170 may include any transceiver-like mechanism that enables computing device 100 to communicate with other devices or networks. The communication interface 170 may include a network interface or a transceiver interface. The communication interface 170 may be a wireless, wired, or optical interface. The communication interface 170 may be configured to alert a translation administrator that a potential error source has been discovered. The communication interface 170 may send an email, a text message, an automated telephone call, or other communications to the translation administrator. The communication interface may be configured to send the translation resource to a human translator for manual translation. The communication interface may be configured to send the translation resource to an automatic translation module for an automatic translation.

The computing device 100 may perform such functions in response to processing core 120 executing sequences of instructions contained in a computer-readable medium, such as, for example, the memory 130, a magnetic disk, or an optical disk. Such instructions may be read into the memory 130 from another computer-readable medium, such as the data storage 140, or from a separate device via the communication interface 160.

Figure 2:
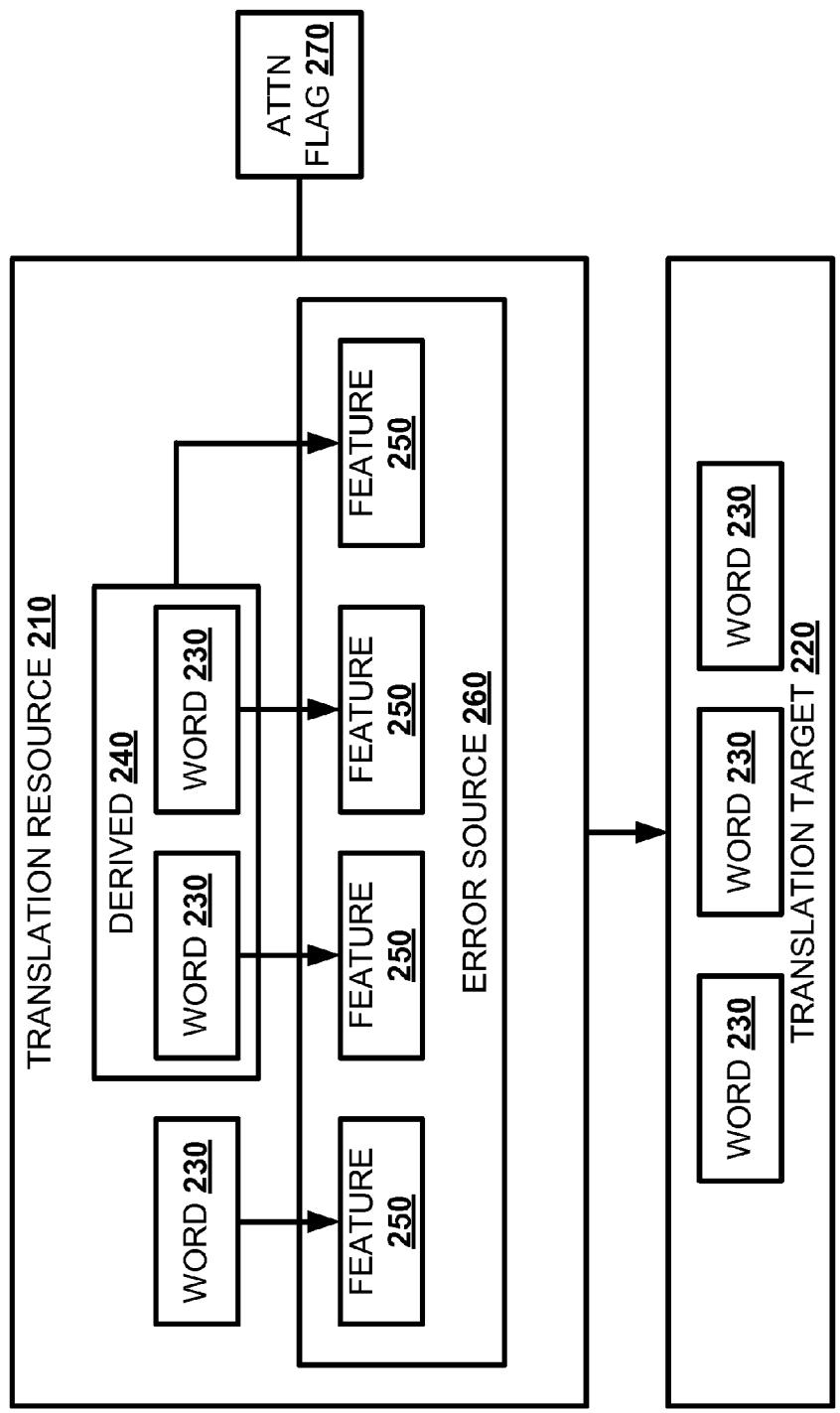
FIG. 2 illustrates, in a block diagram, one embodiment of a translation pair.

FIG. 2 illustrates, in a block diagram, one embodiment of a translation pair 200 as translated via manual translation by a human translator or automatic translation by a translation module. A translation pair 200 may have a translation resource 210 representing a text string prior to translate and a translation target 220 representing the text string after translation. Prior to translation, the translation system may parse the translation resource 210 into a bag of words 230, a sequence of one or more discrete text segments in the text string. The translation system may review the bag of words 230 and identify any word 230 or series of words 230 that are a derived feature 240. A derived feature 240 is a text segment or series of text segments that are not subject to translation. The derived feature 240 may be a text segment not intended for display to the user, such as an instruction to the user interface. For example, a derived feature 240 may be a localization instruction comment, a font face string, a new line character, a neutral character, an email address string, a culture name, a locale label, a uniform resource locator string, an acronym string, a country name, a directional marker, a branded term, a phone number, a technical term, a placeholder string, a hypertext markup language string, a cascade style sheet, a layout string, or a number string.

Collectively, a word 230 or a derived feature 240 may be referred to as a resource feature 250 in the translation resource 210. If the translation bug prediction model identifies a potential error source 260 in the translation resource 210, the translation system may associate an attention flag 270 with the translation resource 210. The attention flag 270 may quickly alert a translation administrator to avoid a translation error. Alternately, if the translation bug prediction model identifies a specific resource feature 250 in the translation resource 210 as a potential error source 260, the translation system may associate the attention flag 270 with the specific resource feature 250. Further, if an automatic translation module has automatically translated a translation resource 210 identified by the translation bug prediction model as a potential error source 260, the translation system may associate the attention flag 270 with the resulting translation target 220.

Figure 3:
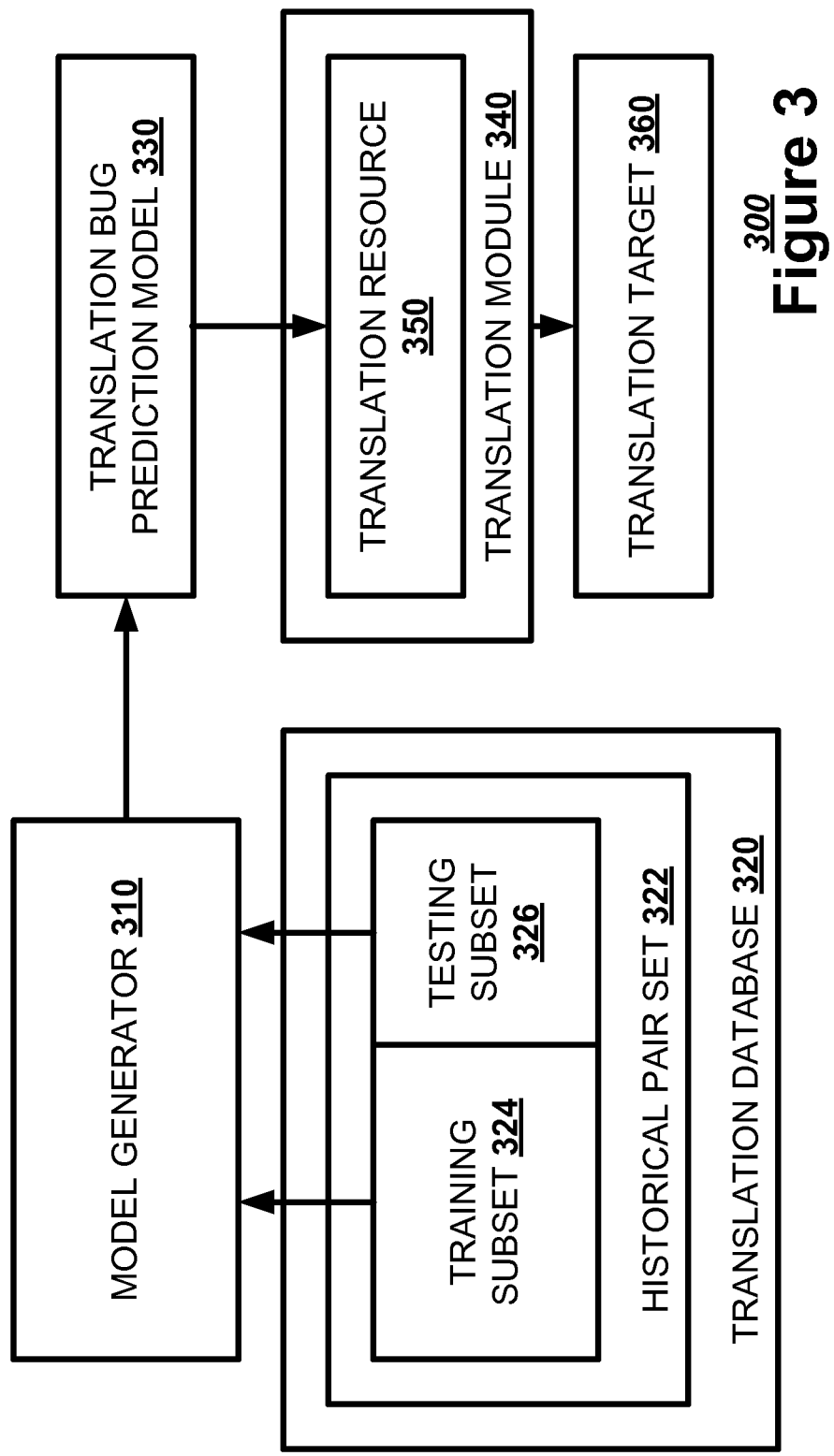
FIG. 3 illustrates, in a block diagram, one embodiment of a translation system.

FIG. 3 illustrates, in a block diagram, one embodiment of a translation system 300. The translation system 300 may be implemented on a single device or across multiple networked devices. The translation system 300 may execute a bug prediction model generator 310 to access a translation resource database 320 storing a set of previously translated resource pairs as a historic translation pair set 322. The bug prediction model generator 310 may divide the historic translation pair set 322 into a translation training subset 324 and a translation testing subset 326. The bug prediction model generator 310 may use the translation training subset 324 to generate a translation bug prediction model 330 to predict translations errors that may occur in future automatic translations. The bug prediction model generator 310 may use the translation testing subset 326 to validate the translation bug prediction model 330.

The translation system 300 may execute an automatic translation module 340 to execute an automatic translation of a translation resource 350 to create a translation target 360. The translation system 300 may apply a translation bug prediction model 330 to the translation resource 350 to predict any translation errors that may occur during the automatic translation. The translation system 300 may associate an attention flag with the translation resource 350 if identified by the translation bug prediction model 330 as a potential error source. Further, the translation system 300 may associate the attention flag with a translation target 360 created from the translation resource 350 by the automatic translation module 340. A translation administrator may then review the translation target 360 to determine whether a translation error occurred.

Figure 4:
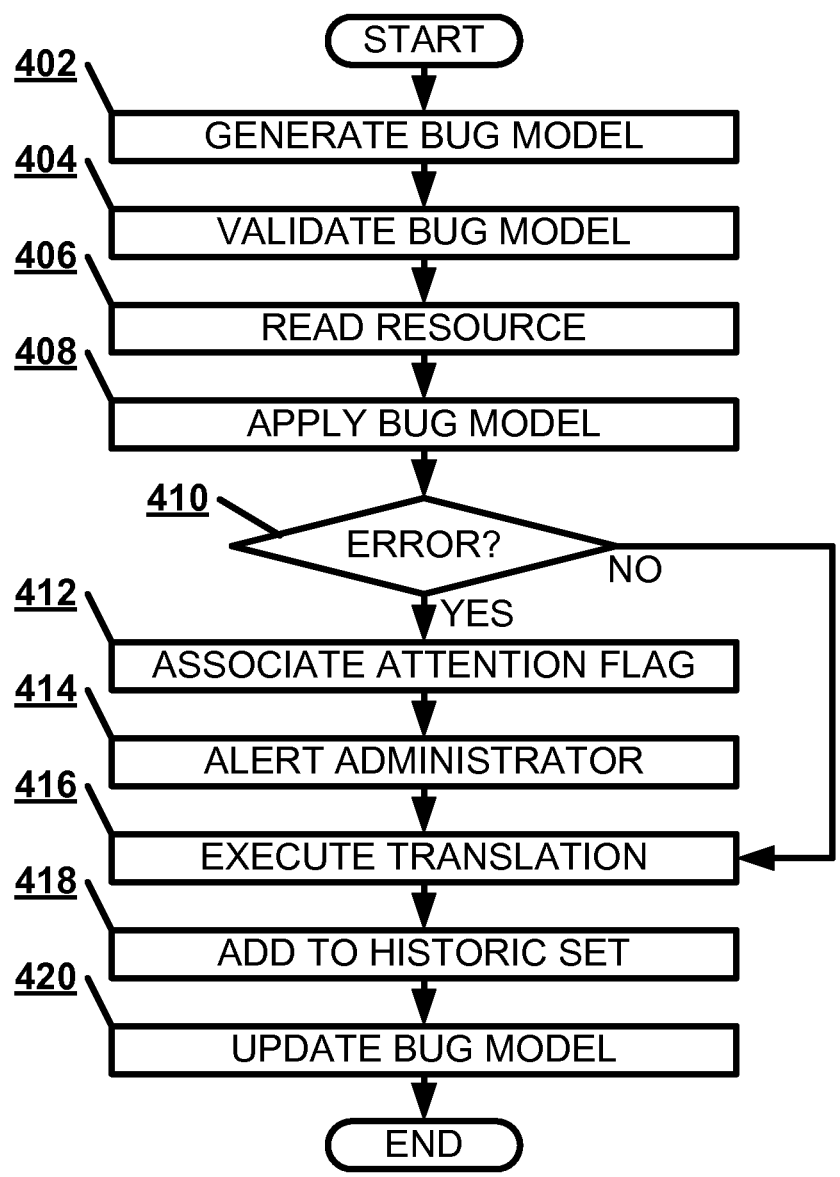
FIG. 4 illustrates, in a flowchart, one embodiment of a method for executing an automatic translation.

FIG. 4 illustrates, in a flowchart, one embodiment of a method 400 for executing an automatic translation. The translation system may generate a translation bug prediction model based on a translation training subset from a historic translation pair set for application to a translation resource to identify whether the translation resource is a potential error source to a translation target (Block 402). The translation system may validate the translation bug prediction model against a translation testing subset from the historic translation pair set (Block 404). The translation system may read a translation resource to be translated (Block 406). The translation system may apply the translation bug prediction model to the translation resource (Block 408). If the translation bug prediction model identifies a potential error source in the translation resource (Block 410), the translation system may associate an attention flag with the translation resource when identified by the translation bug prediction model as a potential error source (Block 412). The translation system may alert the translation administrator that a potential error source has been discovered (Block 414). The translation system may execute an automatic translation of the translation resource to create a translation target (Block 416). Alternately, the translation system may send the translation resource, with the associated attention flag, to a human translator for manual translation. The translation system may add the resulting translation pair to the historic translation pair set (Block 418). The translation system may update the translation bug prediction model based on a periodic review of the historic translation pair set (Block 420).

Figure 5:
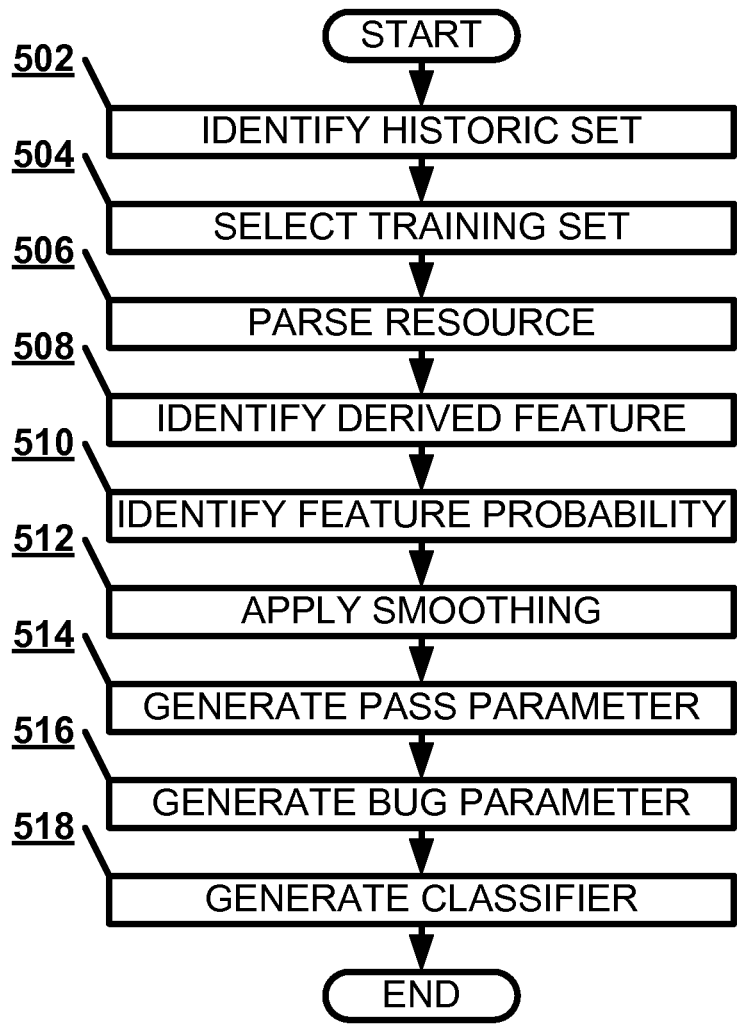
FIG. 5 illustrates, in a flowchart, one embodiment of a method for generating a translation bug prediction model.

FIG. 5 illustrates, in a flowchart, one embodiment of a method 500 for generating a translation bug prediction model. A translation system may identify a historic translation pair set to create a translation bug prediction model (Block 502). The translation system may select a translation training subset from the historic translation pair set (Block 504). The translation system may parse the translation resource of each historic translation pair in the translation training subset into a bag of words (Block 506). The translation system may identify any derived features in the translation resource of each translation pair in the translation training subset (Block 508).

The translation system may identify a feature probability that a resource feature results in a successful translation and an unsuccessful translation (Block 510). The translation system may apply a smoothing function, such as a LaPlace smoothing function with an arbitrary delta value, to avoid a zero frequency (Block 512). The translation system may generate a proportional pass parameter for each resource feature in a translation resource in the translation training subset (Block 514). The translation system may generate a proportional bug parameter for each resource feature in a translation resource in the translation training subset (Block 516). The translation system may generate a naïve Bayesian classifier for each resource feature in a translation resource in the translation training subset (Block 518).

Figure 6:
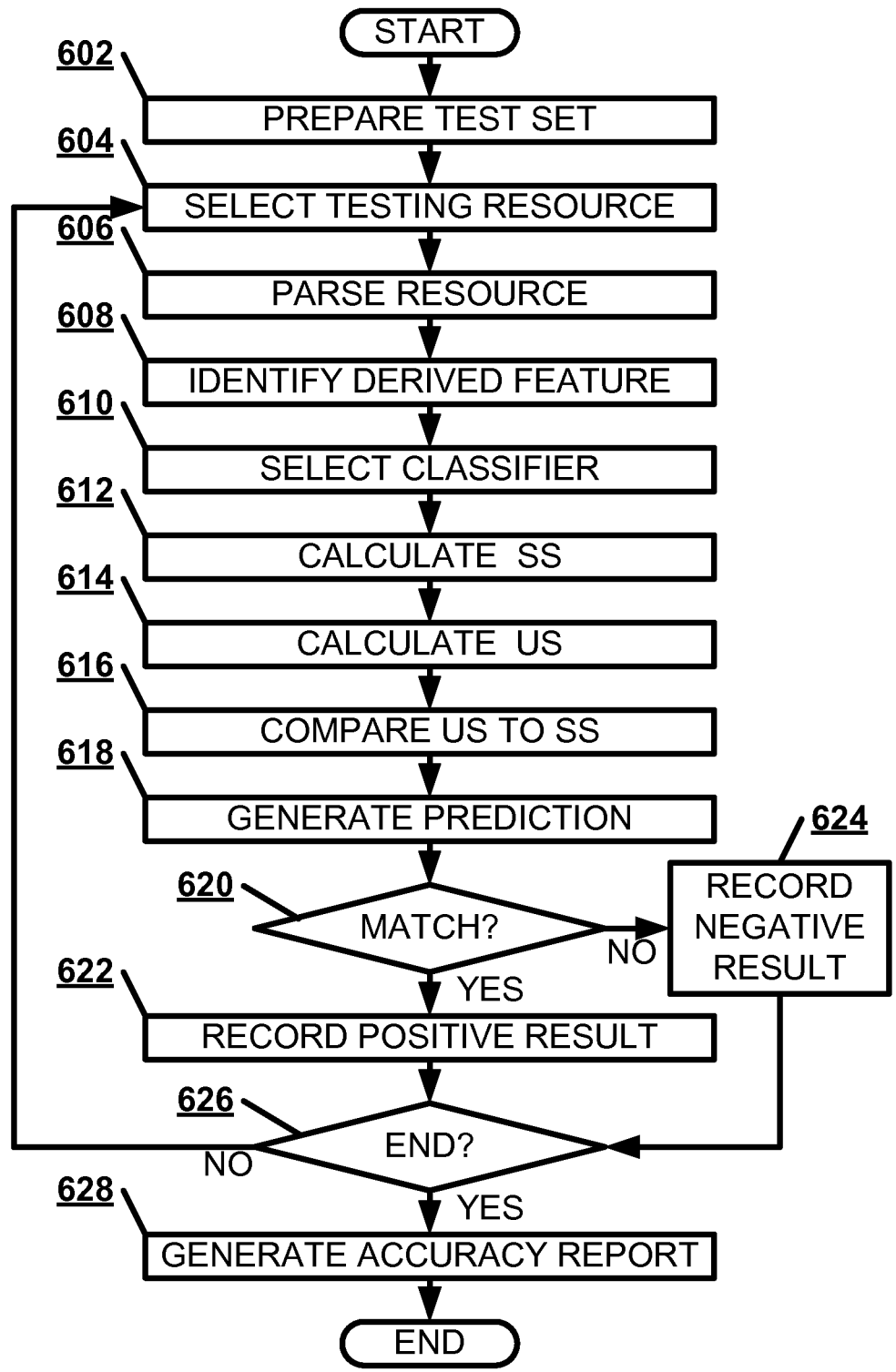
FIG. 6 illustrates, in a flowchart, one embodiment of a method for validating a translation bug prediction model.

FIG. 6 illustrates, in a flowchart, one embodiment of a method 600 for validating a translation bug prediction model. A translation system may prepare a translation testing subset from a historic translation pair set (Block 602). The translation system may select a testing translation resource from the translation testing subset (Block 604). The translation system may parse the testing translation resource into a bag of words (Block 606). The translation system may identify any derived features in the testing translation resource (Block 608).

The translation system may select a naïve Bayesian classifier for each resource feature in the testing translation resource (Block 610). The translation system may calculate a successful score (SS) for a successful translation of the testing translation resource based on the translation bug prediction model (Block 612). The translation system may calculate an unsuccessful score (US) for an unsuccessful translation of the testing translation resource based on the translation bug prediction model (Block 614). The translation system may compare the successful score for the testing translation resource to the unsuccessful score for the testing translation resource (Block 616). The translation system may generate an error prediction based on the comparison (Block 618). If the unsuccessful score is greater than the successful score, the translation system predicts an error. If the unsuccessful score is not greater than the successful score, the translation system predicts no error.

If the error prediction matches the actual error outcome of the translation of the testing translation resource (Block 620), the translation system may record a positive result for the error prediction (Block 622). If the error prediction does not match the actual error outcome of the translation of the testing translation resource (Block 620), the translation system may record a negative result for the error prediction (Block 624). If the testing translation resource is not the last testing translation resource in the translation testing subset (Block 626), the translation system may select the next testing translation resource from the translation testing subset (Block 604). If the testing translation resource is the last testing translation resource in the translation testing subset (Block 626), the translation system may generate an accuracy report for the translation bug prediction model upon validation (Block 628).

Figure 7:
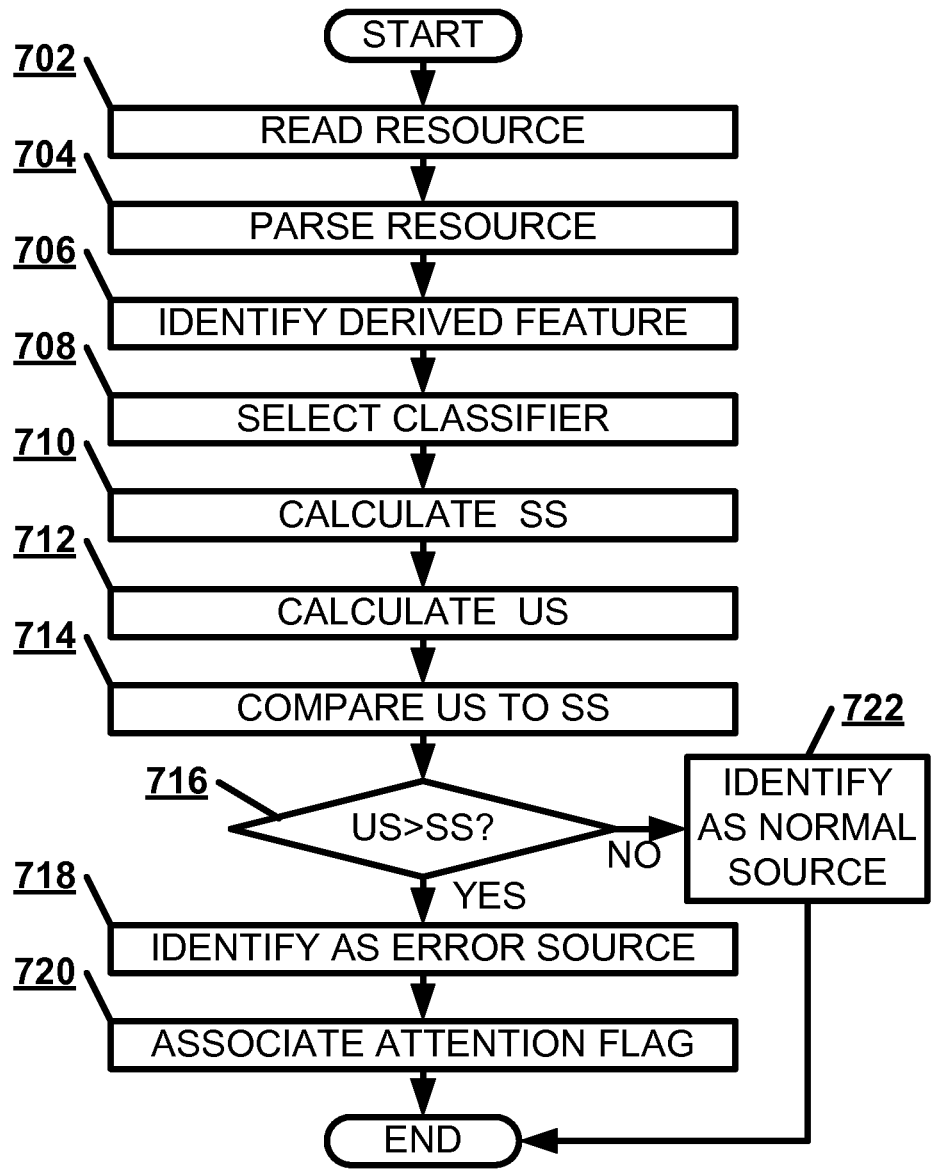
FIG. 7 illustrates, in a flowchart, one embodiment of a method for applying a translation bug prediction model.

FIG. 7 illustrates, in a flowchart, one embodiment of a method 700 for applying a translation bug prediction model. The translation system may read a translation resource to identify a potential error source (Block 702). The translation system may parse the translation resource into a bag of words (Block 704). The translation system may identify any derived features in the translation resource (Block 706). The translation system may select a naïve Bayesian classifier in the translation bug prediction model for each resource feature in the translation resource (Block 708). The translation system may calculate a successful score for a successful translation based on the translation bug prediction model (Block 710). The translation system may calculate an unsuccessful score for an unsuccessful translation based on the translation bug prediction model (Block 712). The translation system may compare an unsuccessful score for the translation resource with a successful score for the translation resource (Block 714). If the unsuccessful score is greater than the successful score (Block 716), the translation system may identify the translation resource as having a resource feature that is a potential error source (Block 718). The translation system may associate an attention flag with the translation resource when identified by the translation bug prediction model as a potential error source (Block 720). If the unsuccessful score is not greater than the successful score (Block 716), the translation system may identify the resource feature as a normal source (Block 722).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to store desired program code means in the form of computer-executable instructions or data structures, as opposed to propagating media such as a signal or carrier wave. Computer-readable storage media explicitly does not refer to such propagating media. Combinations of the above should also be included within the scope of the computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users.

Accordingly, the appended claims and their legal equivalents should only define the invention, rather than any specific examples given.

We claim:

1. A translation system, comprising:
a memory configured to store a translation bug prediction model and a translation resource; and
a processing core having at least one processor configured to apply a translation bug prediction model to the translation resource to calculate a successful score for the translation resource, calculate an unsuccessful score for the translation resource, identify a potential error source based on the successful score and the unsuccessful score, and execute an automatic translation of the translation resource to create a translation target,
wherein the successful score for the translation resource and the unsuccessful score for the translation resource are based on whether a previous translation was corrected.

2. The translation system of claim 1, wherein the translation bug prediction model generates a naïve Bayesian classifier for a resource feature in the translation resource.

3. The translation system of claim 1, wherein the at least one processor is further configured to compare an unsuccessful score for the translation resource with a successful score for the translation resource.

4. The translation system of claim 1, wherein the at least one processor is further configured to parse the translation resource into a bag of words.

5. The translation system of claim 1, wherein the at least one processor is further configured to identify a derived feature in the translation resource.

6. The translation system of claim 1, wherein the at least one processor is further configured to execute a bug prediction model generator to generate the translation bug prediction model based on a translation training subset from a historic translation pair set.

7. The translation system of claim 1, wherein the at least one processor is further configured to execute a bug prediction model generator to validate the translation bug prediction model against a translation testing subset from a historic translation pair set.

8. The translation system of claim 1, wherein the at least one processor is further configured to execute a bug prediction model generator to update the translation bug prediction model based on a periodic review of a historic translation pair set.

9. A tangible machine-readable medium having a set of instructions detailing a method stored thereon that in response to begin executed by one or more processors cause the one or more processors to perform the method, the method comprising:
selecting a translation training subset from a historic translation pair set;
generating a translation bug prediction model based on the translation training subset for application to a translation resource;
generating a proportional pass parameter for the resource feature in the translation resource;
generating a proportional bug parameter for the resource feature in the translation resource; and
identifying a potential error source based at least on the proportional pass parameter and the proportional bug parameter.

10. The tangible machine-readable medium of claim 9, wherein the method further comprises:
generating a naïve Bayesian classifier for a resource feature in the translation resource.

11. The tangible machine-readable medium of claim 9, wherein the method further comprises:
preparing a translation testing subset from the historic translation pair set.

12. The tangible machine-readable medium of claim 9, wherein the method further comprises:
validating the translation bug prediction model against a translation testing subset from the historic translation pair set.

13. The tangible machine-readable medium of claim 9, wherein the method further comprises:
generates an accuracy report for the translation bug prediction model upon validation.

14. The tangible machine-readable medium of claim 9, wherein the method further comprises:
comparing an unsuccessful score for the translation resource with a successful score for the translation resource.

15. The tangible machine-readable medium of claim 9, wherein the method further comprises:
associating an attention flag to the translation resource when identified by the translation bug prediction model as the potential error source.

16. A machine-implemented method, comprising:
selecting a translation training subset from a historic translation pair set;
generating a translation bug prediction model based on the translation training subset;
applying the translation bug prediction model to a translation resource;
generating a proportional pass parameter for a resource feature in a translation resource;
generating a proportional bug parameter for the resource feature in a translation resource; and
executing an automatic translation of the translation resource.

17. The method of claim 16, wherein applying the translation bug prediction model to the translation resource further comprises:
selecting a naïve Bayesian classifier in the translation bug prediction model for a resource feature in the translation resource;
calculating a successful score for a successful translation based on the translation bug prediction model;
calculating an unsuccessful score for an unsuccessful translation based on the translation bug prediction model; and
compare an unsuccessful score for the translation resource with a successful score for the translation resource.

18. The translation system of claim 1, wherein the translation bug prediction model associates an attention flag with the translation resource when identified by the translation bug prediction model as the potential error source.

19. The method of claim 16, wherein the method further comprises associating an attention flag to the translation resource when identified by the translation bug prediction model as a potential error source.

* * * * *